(12) United States Patent
Schneider et al.

(10) Patent No.: US 6,918,638 B2
(45) Date of Patent: Jul. 19, 2005

(54) DEVICE FOR STABILIZING A MOTOR VEHICLE

(75) Inventors: Markus Schneider, Wiesbaden-Auringen (DE); Fikri El Guenaoui, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/089,955

(22) PCT Filed: Aug. 3, 2001

(86) PCT No.: PCT/EP01/09051

§ 371 (c)(1),
(2), (4) Date: Sep. 17, 2002

(87) PCT Pub. No.: WO02/12037

PCT Pub. Date: Feb. 14, 2002

(65) Prior Publication Data

US 2003/0052536 A1 Mar. 20, 2003

(30) Foreign Application Priority Data

Aug. 4, 2000 (DE) .......................... 100 38 834

(51) Int. Cl.[7] ................................. B60T 8/24
(52) U.S. Cl. ........................ 303/140; 303/186; 303/187
(58) Field of Search ............................ 303/146, 140, 303/171, 175, 186, 187

(56) References Cited

U.S. PATENT DOCUMENTS

| | | | | |
|---|---|---|---|---|
| 4,998,593 A | * | 3/1991 | Karnopp et al. ............ 180/408 |
| 5,857,754 A | * | 1/1999 | Fukami et al. .............. 303/146 |
| 5,863,105 A | * | 1/1999 | Sano .......................... 303/146 |
| 5,893,896 A | * | 4/1999 | Imamura et al. ............... 701/70 |
| 6,035,251 A | * | 3/2000 | Hac et al. ...................... 701/70 |
| 6,185,497 B1 | * | 2/2001 | Taniguchi et al. ............ 701/70 |
| 6,325,469 B1 | * | 12/2001 | Carson et al. .............. 303/140 |
| 6,438,474 B1 | * | 8/2002 | Tanaka et al. ................ 701/41 |
| 6,466,857 B1 | * | 10/2002 | Belvo .......................... 701/82 |
| 6,584,397 B2 | * | 6/2003 | Tanaka et al. ................ 701/70 |

FOREIGN PATENT DOCUMENTS

| | | |
|---|---|---|
| DE | 19515053 | 5/1996 |
| DE | 19619476 | 11/1996 |
| DE | 19813736 | 10/1998 |
| DE | 19919841 | 11/2000 |
| WO | WO02/12037 | 2/2002 |

OTHER PUBLICATIONS

International Search Report for Appln PCT/EP01/09051.
Japanese Abstract 05105048 published Apr. 27, 1993.

* cited by examiner

*Primary Examiner*—Pam Rodriguez
(74) *Attorney, Agent, or Firm*—Honigman Miller Schwartz and Cohn LLP

(57) ABSTRACT

A vehicle stabilizing device for setting or modifying brake pressures in the wheel brakes of a braking system with diagonally divided braking circuits. To improve a stabilization of the vehicle in the case of understeering by an additional delay, a device for determining a understeering drive condition, a controller for calculating a desired speed or deceleration, and derived therefrom a deceleration braking force in accordance with the understeering drive condition, a braking force control which in the wheel brakes of the front axle sets a differential braking force between the wheel brakes, which corrects the understeering drive condition, in accordance with the deceleration control braking force are provided.

8 Claims, 4 Drawing Sheets

DEVICE FOR STABILIZING A MOTOR VEHICLE

TECHNICAL FIELD

This invention generally relates to vehicle drive stabilizing devices and more particularly relates to a drive stabilizing device for setting or modifying braking pressures in the wheel brakes of a braking system with diagonally distributed braking circuits.

BACKGROUND OF THE INVENTION

A plurality of drive stabilizing controls are known to counteract drive instabilities automatically. The term drive stabilizing control combines at least four principles that influence the drive performance of a vehicle by means of selectable pressures or braking forces in or at individual wheel brakes and by means of activating the engine management of the driving motor. Further, this concerns a brake slip regulation (ABS) which during a braking procedure is to prevent the blocking (locking) of individual wheels, a drive slip regulation (ASR) which prevents the driven wheels from spinning, an electronic braking force distribution (EBV) which controls the ratio of the braking forces between the front and rear axle of the vehicle, as well as a yaw moment control (ESP) which ensures stable drive conditions with yawing of the vehicles around the raised axle.

In this context, the term vehicle is defined as a motor vehicle with four wheels, which is equipped with a hydraulic, electrohydraulic or electromechanic braking system. In the hydraulic braking system, the driver is able to build up a braking force by means of a pedal-operated master cylinder, while the electrohydraulic and electromechanic braking systems develop a braking force contingent upon the driver's sensed braking requirements. In the following, reference is made to a hydraulic braking system. Each wheel is provided with a brake to which respectively a inlet valve and an outlet valve are allocated. The wheel brakes are interconnected with the master cylinder via the inlet valves, while the outlet valves lead to an unpressurized container or a low pressure accumulator. Finally, an auxiliary pressure source exists which, irrespective of the position of the brake pedal, is able to build up a pressure in the wheel brakes. The inlet and outlet valves can be activated for regulating the pressure in the wheel brakes electromagnetically.

In order to record the drive dynamic conditions, four speed sensors per wheel are provided, one yaw speed sensor, one cross accelerator sensor, and one pressure sensor for the braking pressure generated by the brake pedal, as well as a longitudinal accelerator sensor in specific vehicle configurations. Further, the pressure sensor can also be replaced by a pedal path or pedal force sensor, if the auxiliary pressure source is so configured that a braking pressure built up by the driver is indistinguishable from that of the auxiliary pressure source.

When controlling the drive stability, the drive performance of the vehicle is so influenced that the driver will be able to better control the vehicle in a critical situation. A critical situation is defined as an unstable driving condition in which in a worst case scenario the vehicle does not follow the driver's commands. The function of the drive stabilization control thus is, within the physical limitations that exist in such situations, to give the vehicle the drive performance commanded by the driver. An unstable drive performance of a vehicle can occur in the case of understeering, in which the measured yaw angle speed varies from the speed to be achieved in such a way that the vehicle does not adequately corner, as expected.

An ESP understeering action, which in this case is initiated by the yaw moment controller, attempts to stabilize the vehicle by effecting a braking action at the cornered inside rear wheel. On the one hand, in the course of stationery cornering with strong understeering tendency and high transverse acceleration level, this type of understeering action, however, only has a limited effect as a result of the standard power reduction at the cornered inside rear wheel. Because in this case the wheel only contributes little to the cornering force at the rear axle and is unable to transform large axial longitudinal forces, the yaw moments, which can be generated at this wheel as a result of a braking action, and thus the stabilization effect are relatively small. On the other hand, the cornering power reserve at the rear axle on low drive value is very small. Therefore, the understeering braking action can easily overcompensate (oversteering), which destabilizes the vehicle.

Understeering driving situations of this type occur when, under high friction value conditions, the driver selects or must select a steering angle based on the cornering course which the vehicle is unable to follow at the current speed. The actual reason for the understeered instability, which in these situations is detected by the ESP, therefore exists in a vehicle speed that is not adjusted to the cornering course and the high transverse acceleration level conditioned thereby. Even though the ESP understeering action will reduce the vehicle's instability by initiating a yaw moment around the vehicle's raised axle, the vehicle's speed, however, can only be reduced to a limited extent by the braking forces developed during the action. A reduction of the understeering tendency, however, is achieved only when the vehicle's speed has been reduced as a result of the lower braking effect of the understeering action and due to the delay resulting from the high transverse slip. This time period may extend for several seconds.

Therefore, it would be desirable, if, on the one hand, the understeering of the vehicle was compensated by applying a yaw moment and, on the other hand, by a deceleration of the vehicle.

A feasible solution (understeering control logic) for the aforesaid problem is to brake the vehicle actively with all four wheels and to support the yaw moment, which is generated by the braking action at the cornered inside rear wheel, by a pressure reduction at the cornered outside front wheel. There are a number of reasons why this solution, when used with vehicles using braking systems with diagonally divided braking circuits without preloading, results in the following disadvantages:

a.) Destabilization

In contrast to a vehicle with preloading in which the braking pressure is activated by means of an active booster, the wheel pressures must be generated with the assistance of the return pump. Therefore, varying wheel pressures can be created in the two cycles because of the variations of pump capacities. In a diagonally divided vehicle, the thus created yaw moments can destabilize the vehicle.

b.) Overbraking

During an active pressure buildup through the return pump, no information concerning the actual braking pressure in the wheel brake is available. For this reason, the pressure level formed in the brake calipers may deviate considerably from the setpoint inputs. This may result in comfort problems and, in a worse case scenario, to overbraking at the rear axle.

c.) Braking

If the setpoint input is set in all wheels by means of the return pump, which input is formed by the driver setpoint input (THZ pressure) and the pressure requirements of the cascaded control circuits and correspondingly is transformed by a secondary control circuit, taking into consideration the existing sensor signals or the variables drive therefrom, in a worse-case scenario, when all inlet valves are closed, both circuits are decoupled from the master cylinder (THZ) (brake by wire). For this reason, a brake detection must be ensured which certainly is not ensured in the standard hardware configuration which has one pressure sensor and without redundant brake light switch (BLS).

It is the object of the present invention to improve a stabilization of the vehicle in the case of understeering by an additional delay.

The foregoing object is achieved in the present invention by a device, which comprises a detecting device for determining an understeering vehicle condition, a controller for calculating a desired speed or desired deceleration and a deceleration braking force derived therefrom, subject to the understeering vehicle condition, a controller for calculating the differential braking force, correcting the understeering vehicle condition in the wheels of the front axle in accordance with the deceleration control braking force and the understeering vehicle condition, as well as a controller which transforms these braking force requirements into braking pressures.

The above-described invention solves the three above-described problems for diagonally divided vehicles without preload.

Destabilization

If the active pressure buildup on the front axle remains limited, the rear axle always is able to transfer the maximum cornering force. Consequently, the braking action will be unable to destabilize the vehicle.

Overbraking

The pressure buildup is limited to the front axle. Consequently, overbraking at the rear axle is no longer possible. Because the vehicle's deceleration can be calculated exactly from the free-running wheels at the rear axle, the comfort problem can be solved by resetting the pressure interface to a deceleration interface.

Braking

Because in a vehicle with a braking system with diagonally divided braking circuits, the wheels on one side are allocated to different braking circuits, these wheels can be regulated by means of ETR control. An exemplary ETR (control changeover blocking valve control) is explained in DE 19919841.1 to which extensive reference is made. Consequently, the driver at least is able to brake with two wheels (approx. 70% of the overall brake performance), even if the brake detection does not function.

It is advantageous that the braking pressure control, as a function of the understeering vehicle condition, generate signals for a pressure requirement which leads to a yaw moment of the vehicle following the pressure buildup and pressure reduction of the braking circuits at the front axle and transmit the corresponding control commands to the actuators. Because the axial longitudinal force differential created by the braking force buildup/reduction at the front axle (optionally side force buildup at the rear axle) provides the vehicle with a yaw moment in accordance with the understeering vehicle condition, the unstable drive performance of the vehicle is reduced by adhering to the vehicle stability criteria. The yaw moment is built up by modifying a driver-independent controlled braking pressure which, in accordance with a suitable distribution of the transverse acceleration level, leads to a first reduction of the vehicle speed. As a result, in that the desired braking forces leading to the differential braking force as a function of a vehicle deceleration $a_{Soll}$, which in dependence on a control deviation $\Delta\psi$, which is formed by available sensor signals or from signals derived therefrom, which are a measure for the understeering condition of the vehicle and the vehicle speed $v$ is ascertained, and in that an offset $F_A\psi$ are formed, in addition to reducing the understeering tendency caused by the braking effect of the ESP understeering action for creating the yaw moment due to the braking effect in accordance with the vehicle deceleration, a reduction in the vehicle speed is achieved advantageously by braking at the front axle.

It is an advantage that the desired braking forces for the front axle are to be formed according to the relation $F_{Soll} = a_{Soll} f(\Delta\psi, v\ a_{quer}\ \delta)$ with $F_{Soll}$=braking force at the rear brakes of the front axle, $a_{Soll}$=vehicle setpoint deceleration, $\Delta\psi$=quantity for the understeering tendency of the vehicle, $v$=vehicle speed, $a_{quer}$=transverse acceleration, $\delta$=steering wheel angle or steering angle. Further, the desired braking force at the cornered inside front wheel is formed according to the relation $F_{Soll} = F_e = a_{Soll} f(\Delta\psi, v\ a_{quer}\ \delta)$ and the cornered outside front wheel according to the relation $F_{Soll} = a_{Soll} f(\Delta\psi, v\ a_{quer}\ \delta) - \Delta\psi$ with $F_A\psi$=braking force differential value between the wheel brakes of the front axle.

The braking force requirements for the braking force buildup at the cornered inside front wheel is limited advantageously to an upper value to which a maximum slip range is allocated (maximum slip cornering, i.e., maximum transferable axial longitudinal force) during which the ABS control is activated.

The cornered outside front wheel will attempt to adjust the power difference $F_A\psi$ to the cornered inside front wheel. If during the power buildup at the front wheels the pressure requirement $P_{Soll} = f\{F_{Soll}\}$, which is generated from the pressure requirement, becomes 0 bar for the pressure buildup in the cornered outside front wheel in accordance with the understeering control braking pressure, i.e., if the required braking force difference at the front axle cannot be transformed completely, a brake force buildup occurs at the cornered inside rear wheel subject in accordance with the understeering control braking force. Further, the braking force difference $F_A\psi$, which cannot be converted at the cornered outside front wheel, or a partial or residual braking force $F_A\psi$ positioned at the diagonal opposite rear wheel is controlled.

An advantageously designed braking system with diagonally divided braking circuits comprises one changeover valve and one blocking valve per braking circuit, in which the desired brake pressures are controlled by selecting the changeover and/or blocking valves in the wheel brakes.

Advantageously, the device or controller comprises the following units:

A deceleration unit, which generates a deceleration requirement depending on the control deviation and vehicle speed, which a deceleration controller attempts to implement by means of the braking force requirements $F_a$ at the front axle (decalaration maximum up to the blocking pressure of the front wheels, which the ABS control actively engages).

A yaw moment unit, which calculates the required yaw moment as a function of the control deviation, which yaw moment is then generated through the buildup of a brake force difference $F_A\psi$ between the two front wheels.

A braking force control unit, which converts the braking force setpoint requirements $F_{Soll}$ correspondingly into braking pressures.

The pressure requirements of the two front wheels thus are as follows:

At the cornered inside front wheel an attempt is made to convert the braking force requirement $F_a$ of the deceleration controller. Further, braking force requirements above the maximum transferable axial longitudinal force $F_{block}$, i.e., which are in excess of the blocking pressure level $P_{block}$, (=>ABS) cannot be completely converted.

At the cornered outside front wheel an attempt is made to set the braking force difference $F_A\psi$ for the cornered inside wheel, i.e., the desired pressure requirement is calculated as follows:

$F_a - F_A\psi$; if $F_a$ is below the blocking pressure level.
$F_{Block} - F_A\psi$; if $F_a$ is above the blocking pressure level.

If the required braking force difference at the front axle cannot be converted completely, i.e., $F_A\psi$ is greater than $F_a$ or $F_{Block}$, the pressure requirement at the cornered outside front wheel becomes zero. In this case, an attempt is made to convert the remaining required yaw moment by a braking action at the cornered inside rear wheel.

Advantageous developments are described in the dependent claims.

Furthermore, the terms braking force and braking pressure are used in the same context, because the braking force and the braking pressure are interconnected Fa=f(Pa).

DETAILED DESCRIPTION OF THE PREFERRED EMBODIMENTS

Figure 1:
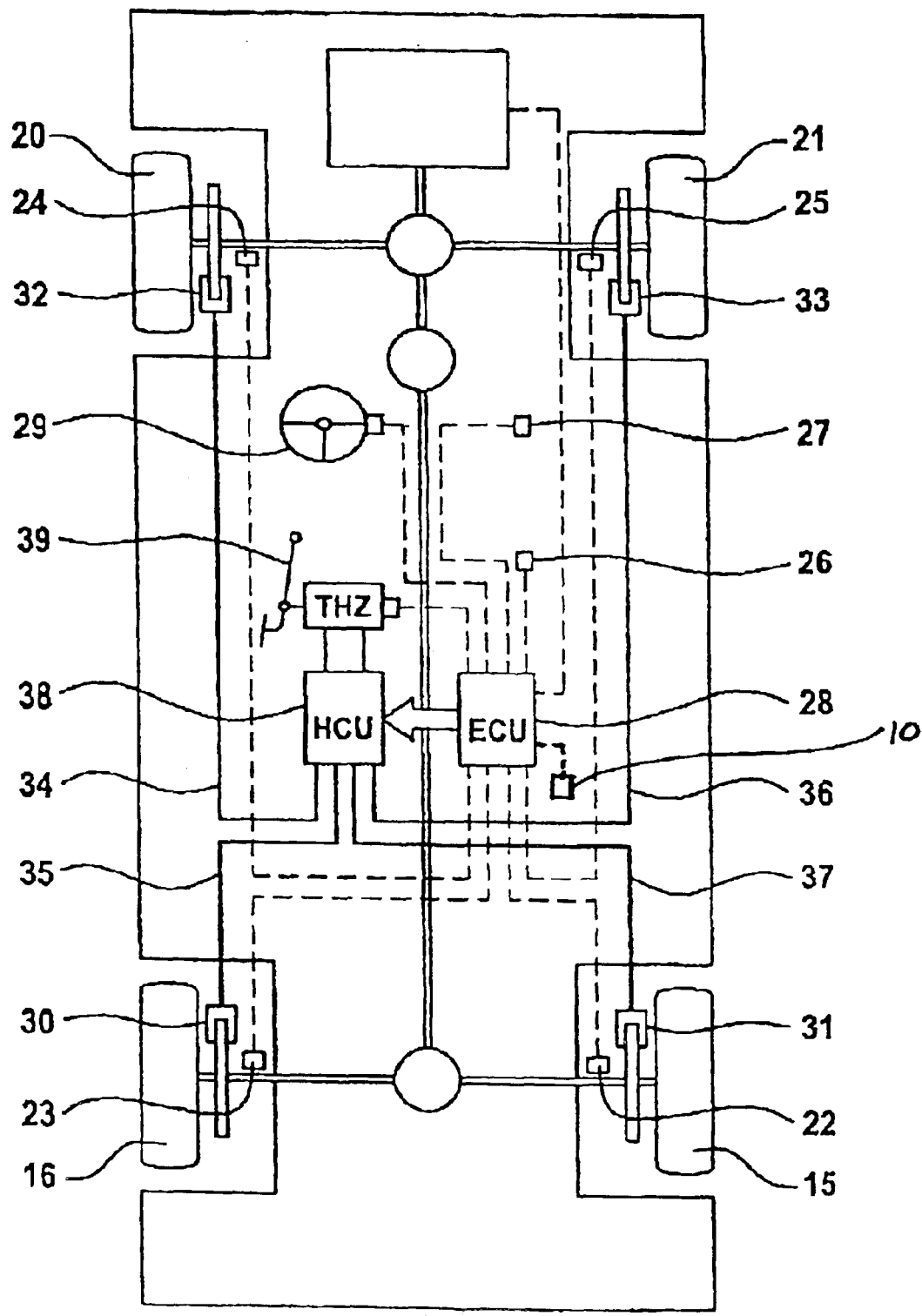
FIG. 1 shows a diagrammatic presentation of a motor vehicle with ESP control system, braking system, sensor technology and communication facilities.

FIG. 1 shows a motor vehicle with ESP control system, braking system, sensor technology and communication facilities. The four wheels are designated as 15, 16, 20, 21. A wheel sensor 22 through 25 is provided at each wheel 15, 16, 20, 21. The signals are transmitted to an electronic controller 28, which determines the vehicle speed $V_{Ref}$ by means of the selected wheel speed criteria. Furthermore, a yaw rate sensor 26, a transverse acceleration sensor 27, a longitudinal acceleration sensor 10 and a steering wheel angle sensor 29 are connected with the controller. In addition, each wheel comprises an individually selectable wheel brake 30 through 33. Said brakes are operated hydraulically and are supplied with pressurized hydraulic fluid via hydraulic lines 34 through 37. The braking pressure is set by way of the valve block 38, wherein the valve block is controlled by electric signals irrespective of the driver, which are generated in the electronic controller 28 (yaw moment unit). By operating the brake pedal 39, the main cylinder 1 can be controlled by the driver to provide braking pressure to the hydraulic lines 34 through 37. A pressure sensor 11 (FIG. 2) is provided in the main cylinder or the hydraulic lines, by means of which the driver brake desired can be recorded. The controller 28 is connected with the engine controller of the drive unit by way of an interface such as a CAN bus.

Figure 2:
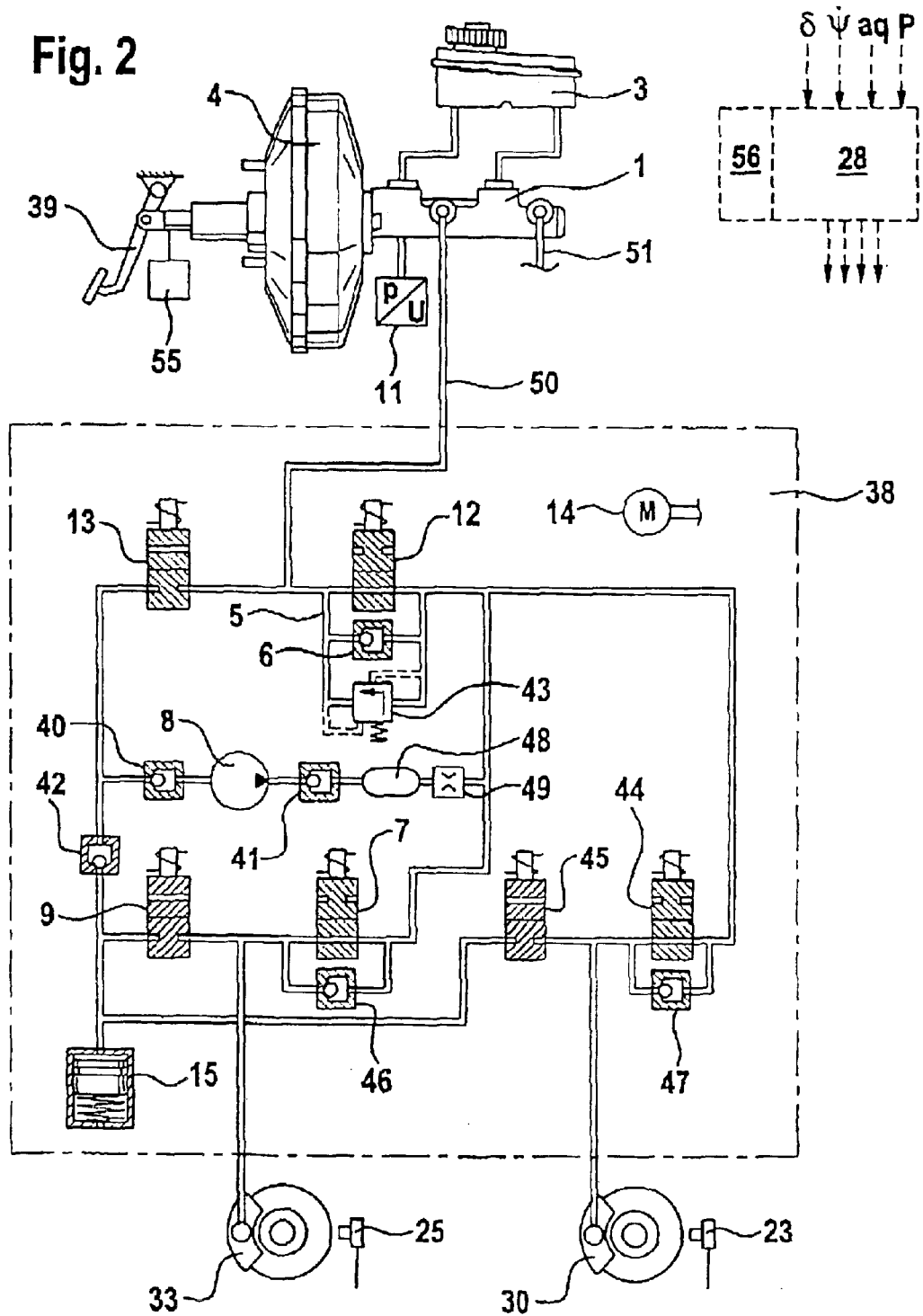
FIG. 2 shows a diagrammatic presentation of a hydraulic braking system.

FIG. 2 shows a braking system with a diagonally divided braking circuit. The braking system essentially consists of a brake pedal 39 with allocated brake light switch BLS, a braking force amplifier 4, a brake cylinder (tandem master cylinder) 1 and a hydraulic fluid reservoir 3. The master cylinder 1 generates a braking pressure at the output side primarily according to the driver desire by means of the brake pedal 39. This braking force is transmitted to the valve block 38 by way of the hydraulic lines 50, 51. The wheel brakes 30, 31, 32, 33 also are connected with the valve block 38. An inlet valve 7 and an outlet valve 9 are allocated to a wheel brake 33. As a rule, the inlet valve is connected currentless and open, and the outlet valve is connected currentless and closed. At the inlet side, the inlet valve 7 is supplied with pressurized hydraulic fluid from a pressure source, for example, the master cylinder 1. Furthermore, a hydraulic pump 8 is provided for the wheel brake 33. In the shown embodiment, the hydraulic pump, where appropriate, feeds pressurized hydraulic fluid to the inlet side of the inlet valve 33. 8 is designated as the mechanical section of the pump, for example, an eccentric pump, which is provided in or at the valve block, 14 the electric drive, for example, an electric motor. At the suction side, the pump 8, 14 generally is connected with a hydraulic fluid source. In the shown embodiment, said pump is able to draw hydraulic fluid from the master cylinder.

The pump 8, 14 is located between a suction side check valve 40 and an outlet side check valve 41. Between the outlet of the pump 8, 14 and the primary pressure source or the master cylinder 1, a block valve 12 is provided which, for example, can be closed when the pump 8, 14 is in operation. This ensures that the supplied fluid enters the wheel brake 33 through the inlet valve 7, instead of flowing back in the direction of the tandem master cylinder 1. 15 is a low-pressure vessel, which receives hydraulic fluid discharged by way of the outlet valve 9. 42 is a check valve. As a rule, the switchover valve 13 is closed with no current, the block valve 12 is open with no current. A check valve 6 and an overpressure valve 43 are connected parallel to said block valve in a bypass line 5. The check valve 6 opens towards the wheel brake 33. In the shown embodiment the pump 8, 14 operates for the two wheel brakes 33, 30. Generally, it can be said that each of the wheels 15, 16, 20, 21 or for each wheel brake 30, 31, 32, 33 individual inlet valves 7, 44 and outlet valves 9, 45, as well as check valves 46, 47 are provided. In terms of the valves 12, 13, the braking system is so designed that said valves are respectively provided for a pair of wheel brakes 33, 30 of a diagonally divided braking circuit. In the embodiment of FIG. 2, the pump 8, 14 operates the wheel brake 33 (FIG. 1) for the right front axle and the wheel brake 30 for the left rear axle. Because the second braking circuit for the wheel brakes 31, 32 is identically designed and is connected with the hydraulic line 51, a description is not necessary. 48 is a brake fluid reservoir and 49 a pressure choke.

Figure 3:
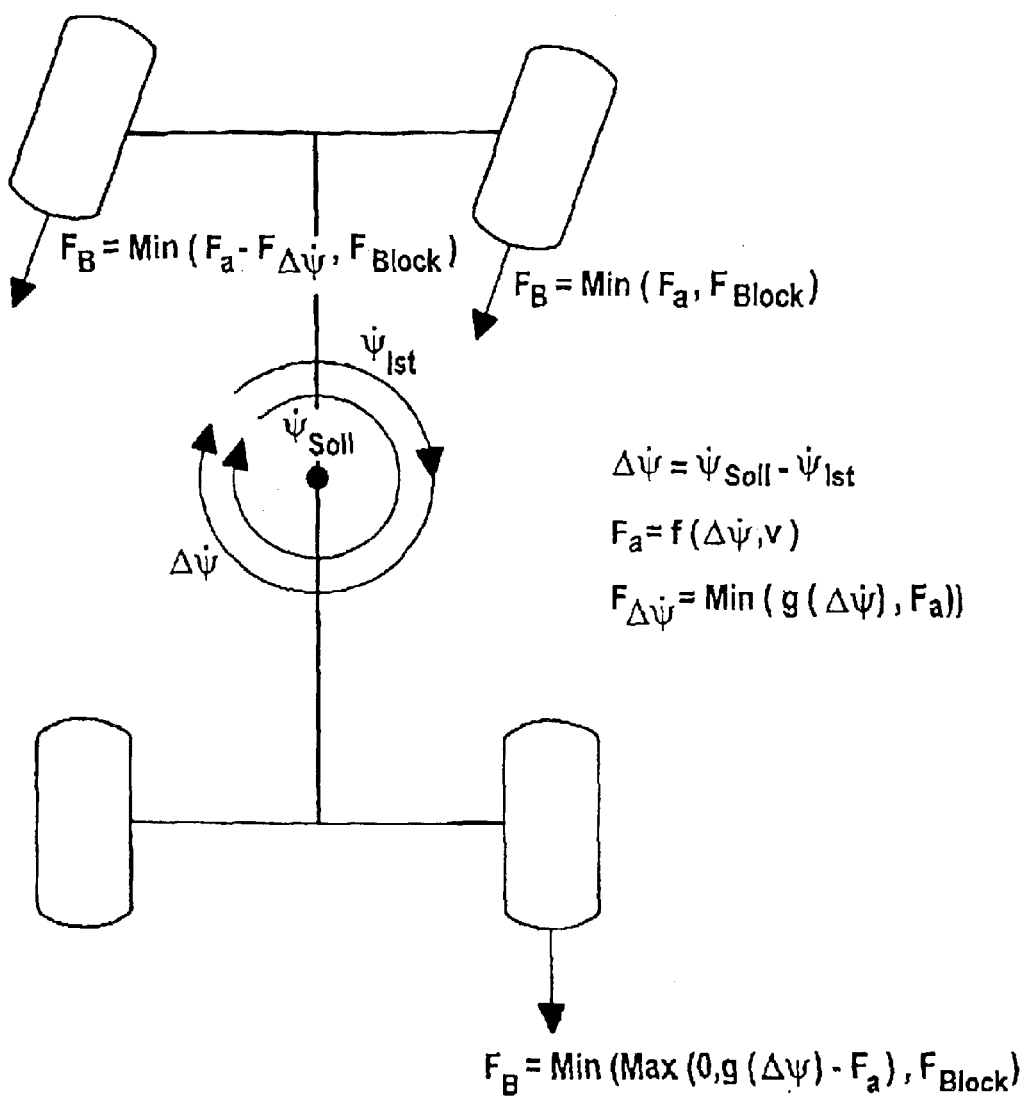
FIG. 3 shows a diagrammatic presentation of the braking force distribution in the case of understeering.

As a rule, the inventive device dispenses with the pressure buildup at the rear axle and converts the required yaw moment caused by the pressure difference at the front axle. Thereby, the pressure becomes active by means of a pure changeover block valve control (ETR control) up to the blocking pressure level. The essential characteristic of an ETR control is that the braking pressure is set by way of a gradual control of the pump 8, 14 in the braking circuit. Consequently, the braking pressure requirement is set to $P_{Soll}$ in the wheel brake 33 of the right front axle in accordance with the selection of the drive 14. Thus, the inlet valve 7 at the front axle always is open, which enables a braking operation in the front axle, even when the indicator switch and the pressure sensor 11 are defective. During this operation, the inlet valve 44 at the wheel brake 30 of the rear axle is closed. The setpoint pressures $P_{Soll}$ at the front axle are calculated from the braking force requirements $F_a$ of a secondary control circuit 56, which determines a vehicle deceleration $a_{Soll}$ as a function of the control deviation $\Delta\psi$ and the vehicle speed $\upsilon$, as well as an offset $F_A\psi$ that is drawn off from the cornered outside front wheel (FIG. 3).

The vehicle deceleration $a_{Soll}$ preferably is determined according to the relation $a_{Soll}=f(\Delta\psi, \upsilon\ a_{quer}\ \delta)$. The required braking force is calculated from $F_e=f\ (\alpha_{1st}, \alpha_{Soll}, (d(\alpha_{1st}-\alpha_{Soll})/dt)\upsilon, \Delta\psi, a_{quer}, \delta)$ with $a_{1st}$=from the signals of the wheel speed sensors and optionally by a drive deceleration which is determined by a longitudinal acceleration sensor, m=vehicle mass.

An expansion of this logic exists in that a pressure buildup occurs at the cornered inside rear wheel when the setpoint pressure level required at the cornered outside front wheel is 0 bar, because also in this case, the braking can be effected at at least two wheels (a front and a rear wheel), because in this case the two engagement wheels are located in different diagonals, and thus the pressures can be set by means of a changeover valve block valve control (ETR). The setpoint brake force at the cornered outside front wheel becomes 0, if $F_a$ becomes smaller than $F_A\psi$ or if $F_a$ at the cornered inside front wheel exceeds the maximum transferable longitudinal force $F_{Block}$ ($F_{Block}<F_A\psi$). Thereby, the braking force requirement at the cornered inside rear wheel is calculated from the difference between $F_{Block}$ and $F_A\psi$, i.e., the portion of the brake shear, which cannot be converted at the front axle. Further, the engagement at the rear wheel, depending on the objective (greater stability or greater rotating ability) can either be limited or not limited to the ABS-desired slip.

Figure 4:
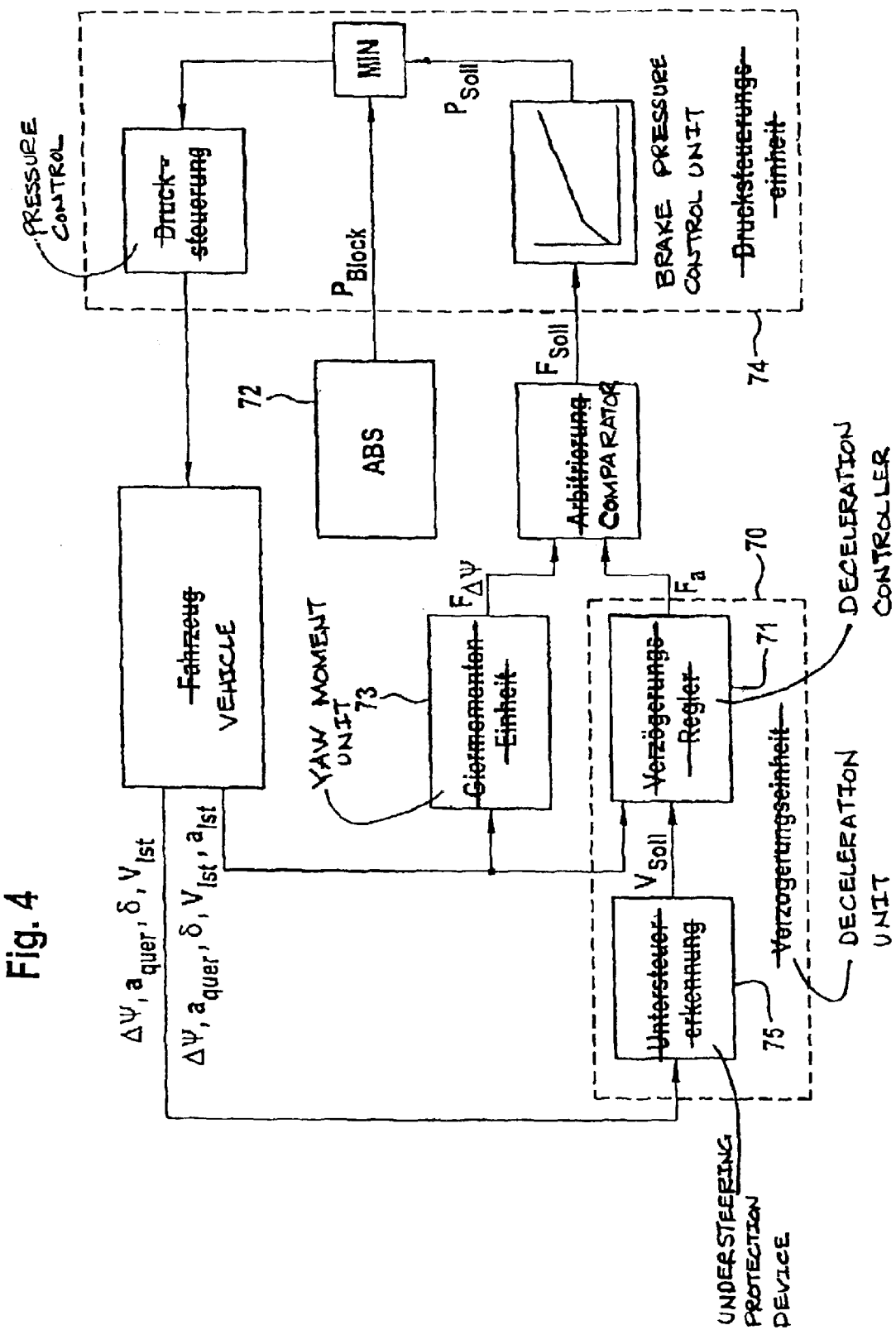
FIG. 4 shows a diagrammatic block diagram of the individual components.

FIG. 4 shows a diagrammatic block diagram of the secondary control circuit 56. The control circuit comprises the following units:

A deceleration unit 70 with an understeering protection device 75 which, depending on the control deviation and the vehicle speed, generates a deceleration requirement, which a deceleration controller 71 attempts to convert by means of the braking force requirements $F_a$ at the front axle (deceleration maximum up to the blocking pressure of the front wheels, in which the ABS control 72 actively engages, is possible).

A yaw moment unit 73, which calculates the required yaw moment dependent on the control deviation, which then is generated as a result of the buildup of a braking force difference $F_A\psi$ between the two front wheels.

A braking pressure control unit 74, which correspondingly converts the braking force setpoint requirements $F_{Soll}$ into braking pressures.

What is claimed is:

1. Vehicle stabilizing device for setting or modifying broke pressures in the wheel brakes of a braking system with diagonally divided braking circuits, comprising:
   a device for determining the presence of an understeering drive condition,
   a controller for calculating a desired vehicle speed or vehicle deceleration, and deriving therefrom a deceleration braking force in accordance with the understeering drive condition,
   a braking force controller for dispensing with a brake pressure buildup at a rear axle of the vehicle and establishing a differential brake force in the wheel brakes of the front axle, wherein said braking force controller further includes means for determining a vehicle delay value as a function of the differential brake force in the wheel brakes of the front axle and the vehicle speed and wherein the differential brake force in the front axle wheel brakes is effective for correcting the understeering drive conditon, in accordance with the deceleration control brakng force.

2. Vehicle stabilizing device as defined in claim 1, wherein said brake pressure controller includes means for generating signals for a pressure requirement effecting a yaw moment of the vehicle in accordance with a pressure buildup and pressure decrease of the braking pressures at the front axle, and for transmitting control commands to at least one actuator.

3. Vehicle stabilizing device as defined in claim 2, wherein said pressure requirement for the pressure buildup at a cornered inside front wheel is limited to an upper value to which a maximum slip range is allocated, in which an ABS control is activated.

4. Vehicle stabilizing device as defined in claim 2, wherein a pressure buildup at a cornered inside rear wheel is effected according to an understeering control braking pressure, whenever the pressure requirement for the pressure buildup at the cornered outside front wheel is 0 bar.

5. Vehicle stabilizing device as defined in claim 1, wherein the differential braking force is formed as a function of a vehicle setpoint deceleration and an offset differential brake force in the wheel brakes of the front axle.

6. Vehicle stabilizing device as defined in claim 1, wherein said controller further includes means for forming a setpoint braking force at the cornered inside front wheel equal to a braking force at the rear brakes of the front axle.

7. Vehicle stabilizing device as defined in claim 1, wherein said controller further includes means for forming the desired brake pressure at the cornered outside front wheel equal to the difference between the vehicle setpoint deceleration and the braking force at the rear brakes of the front axle.

8. Vehicle stabilzing device as defined in claim 7, wherein the desired brake pressure is controlled by way of a selection of a changeover valve or block valve in the wheel brakes.

* * * * *